(12) United States Patent
Zheng et al.

(10) Patent No.: US 11,026,312 B2
(45) Date of Patent: Jun. 1, 2021

(54) SINGLE-INPUT AND SINGLE-OUTPUT TOUCH PHASE-CUT DIMMING CONTROLLER

(71) Applicant: ZHUHAI SHENGCHANG ELECTRONICS CO., LTD., Zhuhai (CN)

(72) Inventors: Dehua Zheng, Zhuhai (CN); Gengzhen Chen, Zhuhai (CN)

(73) Assignee: ZHUHAI SHENGCHANG ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 16/896,268

(22) Filed: Jun. 9, 2020

(65) Prior Publication Data

US 2020/0305254 A1    Sep. 24, 2020

Related U.S. Application Data

(63) Continuation of application No. PCT/CN2019/000096, filed on May 8, 2019.

(30) Foreign Application Priority Data

May 17, 2018 (CN) .......................... 201820738038.2

(51) Int. Cl.
  *H05B 47/10* (2020.01)
  *H05B 45/30* (2020.01)
  *H05B 47/25* (2020.01)
(52) U.S. Cl.
  CPC ............. *H05B 47/10* (2020.01); *H05B 47/25* (2020.01)

(58) Field of Classification Search
  CPC ...... H05B 45/10; H05B 45/30; H05B 45/327; H05B 45/345; H05B 47/10; H05B 47/24; H05B 47/25; H05B 47/28
  See application file for complete search history.

(56) References Cited

U.S. PATENT DOCUMENTS

| 8,154,221 | B2* | 4/2012 | Godbole | ............... | H05B 45/00 |
| | | | | | 315/307 |
| 2003/0223255 | A1* | 12/2003 | Ben-Yaakov | ....... | H02M 1/4225 |
| | | | | | 363/89 |
| 2007/0182338 | A1* | 8/2007 | Shteynberg | ............ | H05B 45/10 |
| | | | | | 315/200 R |

(Continued)

*Primary Examiner* — Tung X Le
(74) *Attorney, Agent, or Firm* — Bayramoglu Law Offices LLC

(57) ABSTRACT

A single-input and single-output touch phase-cut dimming controller includes an AC input terminal, a dimming output terminal, voltage dependent resistors, rectifiers, diodes, Insulated Gate Bipolar Transistors (IGBT), resistors, a sampling circuit, a power supply circuit, a driver circuit, a single-chip microcomputer processor, a touch circuit, an over-current protection circuit, and a brightness regulator. The components on each circuit unit are correspondingly connected to and adapt to each other according to the functional requirements of the circuit design. The controller allows full current to be delivered to the control circuit while lowering overall power consumption and improving convenience and compatibility. The new touch dimmer is not limited to mechanical endurance, and has functions such as soft start, over-current protection and current-limiting protection.

2 Claims, 2 Drawing Sheets

(56) References Cited

U.S. PATENT DOCUMENTS

| | | | |
|---|---|---|---|
| 2009/0230880 A1* | 9/2009 | Wang ..................... | H05B 45/38 |
| | | | 315/294 |
| 2013/0170263 A1* | 7/2013 | Newman, Jr. ........ | H05B 39/048 |
| | | | 363/126 |
| 2018/0092174 A1* | 3/2018 | Mosebrook .......... | H05B 47/175 |
| 2020/0187328 A1* | 6/2020 | Chen ................... | H02M 1/4258 |

* cited by examiner

US 11,026,312 B2

SINGLE-INPUT AND SINGLE-OUTPUT TOUCH PHASE-CUT DIMMING CONTROLLER

CROSS REFERENCE TO THE RELATED APPLICATIONS

This application is the continuation application of International Application No. PCT/CN2019/000096, filed on May 8, 2019, which is based upon and claims priority to Chinese Patent Application No. 201820738038.2, filed on May 17, 2018, the entire contents of which are incorporated herein by reference.

TECHNICAL FIELD

The present invention relates to light source dimming technology, and more particularly, to a single-input and single-output touch phase-cut dimming controller.

BACKGROUND

With the rapid growth of the global commercial lighting market, more and more new types of phase-cut dimmer products have emerged in the electronics lighting industry. The Silicon-Controlled Rectifier (SCR) phase-cut dimmers are especially popular and hold a large proportion of the market share of dimmers. However, the traditional phase-cut dimmers are all provided with mechanical knobs for adjusting the brightness of light, and thus the traditional phase-cut dimmers are limited by mechanical endurance of the mechanical knobs, and are inconvenient to use, not aesthetically appealing, and damage-prone during installation. Moreover, most dimmers are designed as a dual-input and dual-output fashion, that is, two Live-Neutral (LN) wires are used for input and two LN wires are used for output. Based on this dual-input and dual output fashion, the dimmers cannot directly take the place of traditional switches, causing high overall power consumption, inconvenience to wiring in engineering and a great increase in labor cost and material cost. The single-input and single-output dimmer includes an alternating current (AC) line for input and a dimming line for output. In this way, the traditional switch can be directly replaced by such a dimmer, the overall power consumption is low, there is no additional line required in engineering, which brings much convenience in the practical use of engineering and reduces labor cost and material cost. With regard to the single-input and single-output fashion, if the phase-out dimmer inputs too much current to the control circuit, then the dimming quality and compatibility will be reduced. As a result, many manufacturers use a traditional potentiometer having a mechanical knob to control the dimming process, but a potentiometer with a mechanical knob is limited to the mechanical endurance of the knob. A touch dimmer can overcome the problem of the mechanical endurance, and thus has longer service life than the phase-cut dimmer that employs a mechanical knob.

Therefore, it is highly desirable to develop a single-input and single-output touch phase-cut dimming controller.

SUMMARY

In order to overcome the deficiencies of the prior art, the present invention provides a high-performance single-input and single-output touch phase-cut dimming controller.

The technical solution of the present invention is as follows. A single-input and single-output touch phase-cut dimming controller includes the AC input terminal, the dimming output terminal, the voltage dependent resistor, the rectifier, the diode, the insulated gate bipolar transistor (IGBT), the resistor, the sampling circuit, the power supply circuit, the driver circuit, the single-chip microcomputer processor, the touch circuit, the over-current protection circuit, and the brightness regulator. The AC input terminal is connected to one end of the voltage dependent resistor. The dimming output terminal is connected to the other end of voltage dependent resistor. The AC input terminal is connected to one end of the AC input of the rectifier. The other end of the AC input of the rectifier is connected to the dimming output terminal. The output positive electrode of the rectifier is connected to the anode of the diode. The cathode of the diode is connected to the sampling circuit and the power supply circuit, respectively. The output positive electrode of the rectifier is connected to the collector of the IGBT. The emitter of the IGBT and one end of the resistor are connected to the over-current protection circuit. The other end of the resistor is connected to the input negative electrode of the rectifier and the ground of the circuit. The power supply circuit is connected to the driver circuit, the single-chip microcomputer processor, the touch circuit and the over-current protection circuit, respectively. The single-chip microcomputer processor is connected to the sampling circuit, the driver circuit, the touch circuit, the over-current protection circuit and the brightness regulator, respectively.

The sampling circuit includes the capacitor and the plurality of resistors. The power supply circuit includes the plurality of resistors, the zener diode, the negative-positive-negative(NPN) triode, the NPN triode, the plurality of capacitors and the power supply integrated circuit (IC). The driver circuit includes a plurality of resistors, a capacitor and a diode. The single-chip microcomputer processor includes the single chip microprocessor, a plurality of capacitors, a resistor and a programming interface. The touch circuit includes a touch IC, a resistor and a plurality of capacitors. The over-current protection circuit includes a plurality of resistors, a capacitor and the NPN triode. The brightness regulator includes the rotary encoder. The components on each circuit unit are correspondingly connected to and adapt to each other according to the functional requirements of the circuit design.

The advantages of the present invention are as follows. The present invention includes the AC input terminal, the dimming output terminal, the voltage dependent resistor, the rectifier, the diode, the IGBT, the resistors, the sampling circuit, the power supply circuit, the driver circuit, the single-chip microcomputer processor, the touch circuit, the over-current protection circuit, and the brightness regulators. The AC input terminal is connected to one end of the voltage dependent resistor. The dimming output terminal is connected to the other end of voltage dependent resistor. The AC input terminal is connected to the AC input of the rectifier. The other end of the AC input of the rectifier is connected to the dimming output terminal. The output positive electrode of the rectifier is connected to the anode of the diode. The cathode of the diode is connected to the sampling circuit and the power supply circuit. The output positive electrode of the rectifier is connected to the collector of the IGBT. The emitter of the IGBT and one end of the resistor are connected to the over-current protection circuit. The other end of the resistor is connected to the input negative electrode of the rectifier and the ground of the circuit. The power supply circuit is connected to the driver circuit, single-chip microcomputer processor, the touch circuit and the over-current protection circuit, respectively. The single-chip microcomputer processor is connected to the sampling circuit, the driver circuit, the touch circuit, the over-current protection circuit and the brightness regulator. The present invention overcomes the problem that phase-cut dimmer cannot supply too much current to the control circuit, cuts down the overall power consumption. The touch phase-cut dimmer wired in the single-input and single-output manner has excellent dimming quality and compatibility, and is conducive to wire engineering. The touch dimmer, compared to a traditional potentiometer having a mechanical knob, solves the limitations of the service life of the mechanical switch, prolongs the service life of the phase-out dimmer and has more fashionable and aesthetically appealing. Also, soft-start dimming provides smoother and more stable dimming effect, and the minimum brightness gear is adjustable, which remedies the problem of different initial brightness of different power sources. Furthermore, the present invention also features over-current and current-limiting protection and the like.

DETAILED DESCRIPTION OF THE EMBODIMENTS

Figure 1:
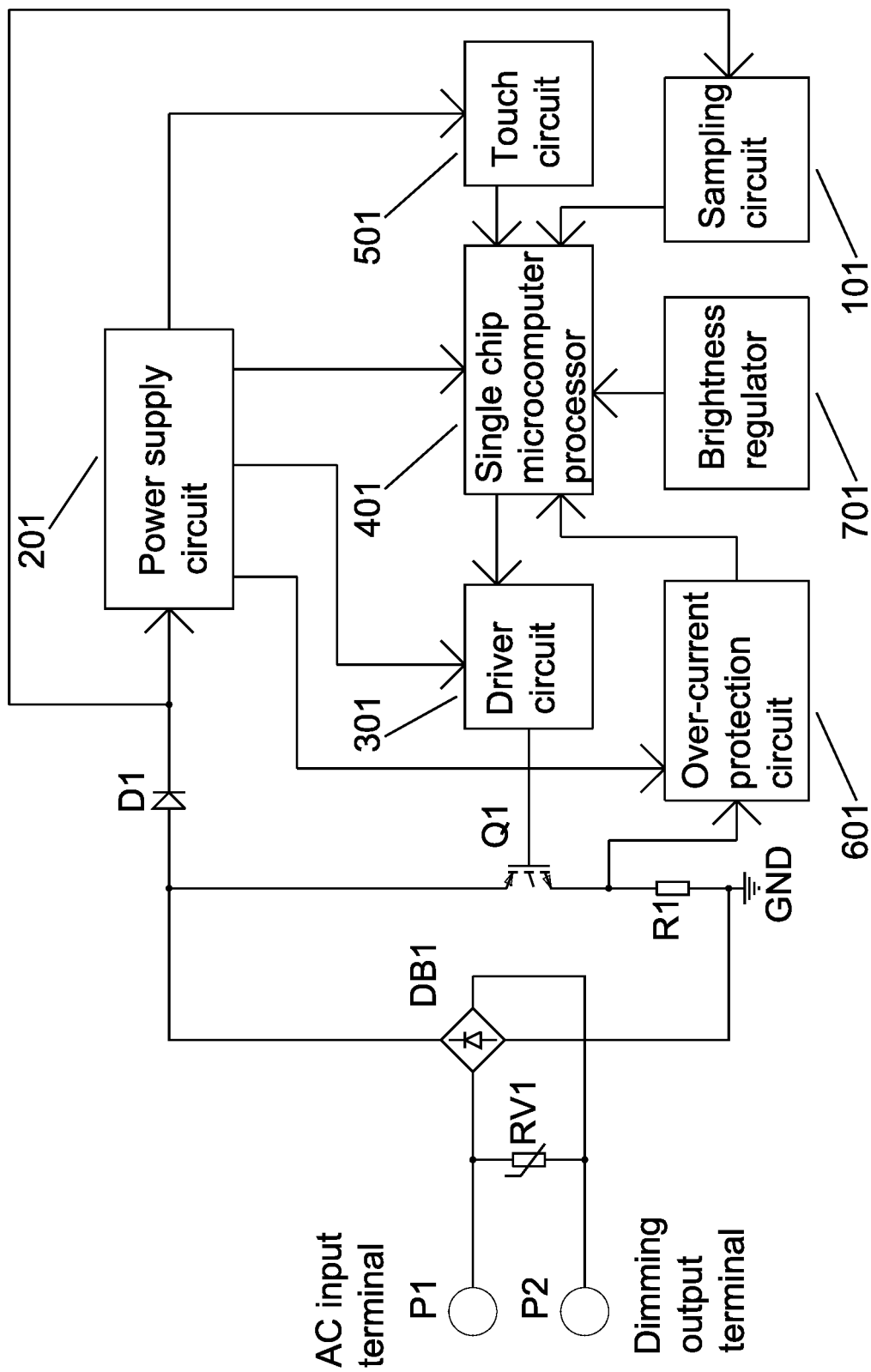
FIG. 1 shows a block diagram of the structure of single-input and single-output touch phase-cut dimming controller.
Figure 2:
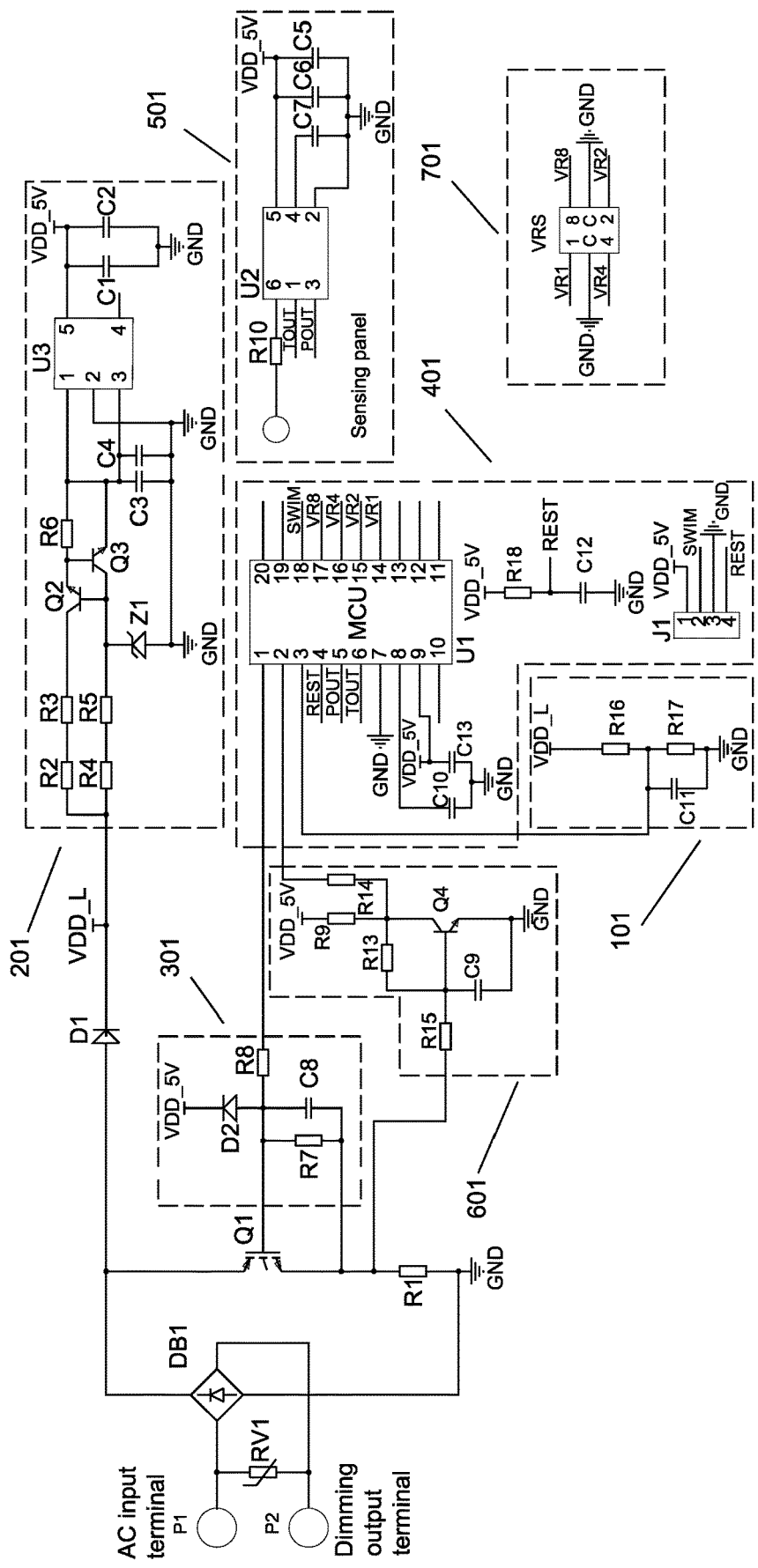
FIG. 2 shows a circuit diagram of the single-input and single-output touch phase-cut dimming controller.

The technical solution of the present invention, shown as FIG. 1 and FIG. 2, includes the AC input terminal P1, the dimming output terminal P2, the voltage dependent resistor RV1, the rectifier DB1, the diode D1, the insulated gate bipolar transistor (IGBT) Q1, the resistor R1, the sampling circuit 101, the power supply circuit 201, the driver circuit 301, the single-chip microcomputer processor 401, the touch circuit 501, the over-current protection circuit 601, and the brightness regulator 701. The AC input terminal P1 is connected to one end of the voltage dependent resistor RV1. The dimming output terminal P2 is connected to the other end of voltage dependent resistor RV1. The AC input terminal P1 is connected to one end of the AC input of the rectifier DB1. The other end of the input of the rectifier DB1 is connected to the dimming output terminal P2. The output positive electrode of the rectifier DB1 is connected to the anode of the diode D1. The cathode of the diode D1 is connected to the sampling circuit 101 and the power supply circuit 201, respectively. The output positive electrode of the rectifier DB1 is connected to the collector of the IGBT Q1. The emitter of the IGBT Q1 and one end of the resistor R1 are connected to the over-current protection circuit 601. The other end of the resistor R1 is connected to the input negative electrode of the rectifier DB1 and the ground of the circuit. The power supply circuit 201 is connected to the driver circuit 301, a single-chip microcomputer processor 401, the touch circuit 501 and the over-current protection circuit 601, respectively. The single-chip microcomputer processor 401 is connected to the sampling circuit 101, the driver circuit 301, the touch circuit 501, the over-current protection circuit 601 and the brightness regulator 701, respectively.

The sampling circuit 101 includes the capacitor C11, the plurality of resistors R16 and R17. The power supply circuit 201 includes the plurality of resistors R2, R3, R4 and R5, the zener diode Z1, the Negative-Positive-Negative(NPN) triode Q2, the NPN triodes Q3, the plurality of capacitors C1, C2, C3 and C4 and the power supply integrated circuit (IC) U3. The driver circuit 301 includes the plurality of resistors R7 and R8, the capacitor C8 and the diode D2. The single-chip microcomputer processor 401 includes the single chip microprocessor U1, the plurality of capacitors C10, C12 and C13, the resistor R18 and the programming interface J1. The touch circuit 501 includes a touch IC U2, the resistor R10 and the plurality of capacitors C5, C6 and C7. The over-current protection circuit 601 includes the plurality of resistors R9, R13, R14 and R15, the capacitor C9 and the NPN triode Q4. The brightness regulator 701 includes rotary encoders VRS. The components on each circuit unit are correspondingly connected to and adapt to each other according to the functional requirements of the circuit design.

In the present embodiment, the single-input and single-output dimmer includes an input alternating current (AC) line and an output dimming line. The single-input and single-output dimmer can directly replace traditional switches, reduces overall power consumption, and is wired in engineering without additional wires, which makes it convenient in practice and engineering and saves on labor and material cost. With regard to the single-input and single-output fashion, the phase-out dimmer cannot supply too much current to control circuit, otherwise the dimming quality and compatibility will be reduced. Consequently, many manufacturers employ the potentiometer having a mechanical knob to achieve the dimming process. The present invention replaces the potentiometer and the mechanical knob with the touch dimmer having good-performance power supply circuits and the touch IC with ultra-low power consumption. Since the touch dimmer outlasts the mechanical knob, the new dimmer control has a longer service life than the phase-cut dimmer using the mechanical knob. Moreover, the present invention also features functions such as soft start, over-current protection and current-limiting protection. The present invention breaks the bottleneck of traditional phase-out dimmer, raising the phase-out dimming field higher than ever before.

The rectifier DB1 rectifies the negative half cycle of the AC input voltage to the positive half cycle, and then transfers the rectified AC voltage to the power supply circuit 201 as the power source of the power supply circuit 201 via the diode D1. The power supply circuit 201 converts the rectified AC voltage into a direct current (DC) voltage to the system as power. The touch circuit 501 transfers the sensed touch signal to the detector of the single-chip microcomputer processor 401. The sampling circuit 101, at the same time, samples the rectified synchronous zero-crossing signal and transfers the synchronous zero-crossing signal to the interrupt port of the single-chip microcomputer processor 401. After the single-chip microcomputer processor 401 detects zero-crossing signal, the duty ratio of the pulse width modulation (PMW) signal is converted by the strength of the touch signal detected by the touch circuit 501. The PWM signal drives the grid of the IGBT by the driver circuit 30I and performs the phase-cut. After that, the phase-cut voltage passes through the resistor R1, and then is rectified by the rectifier DB1 to output the dimming signal. Meanwhile, the over-current protection circuit 601 detects the voltage drop signal from R1 and sends feedback to the analog-to-digital converter (ADC) port of the single-chip microcomputer processor 401 to detect whether the signal exceeds the preset voltage. If the signal exceeds the preset voltage, the single-chip microcomputer processor 401 cuts off the drive signal of the IGBT Q1. The brightness regulator 701 sets 10 levels numbered 0-9 to change the duty ratio of the minimum PWM signal of the single-chip microcomputer processor by selecting the different levels.

In the present embodiment, the AC input terminal P1 and the dimming output terminal are connected to two ends of the voltage dependent resistor RV1, in order to prevent the surge voltage from damaging the dimmer. The negative half cycle of the AC input voltage from the AC input terminal P1 is rectified by the rectifier DB1 to be the positive haft cycle. After that, the AC input voltage is rectified again via the diode D1 and then transferred to the power supply circuit 201. The linear voltage regulation circuit, consisting of the resistor R2, the resistor R2, the resistor R4, the resistor R5, the zener diode Z1 and the NPN triode Q2 of the power supply circuit 201, reduces the voltage of the rectified voltage and then the rectified voltage is filtered by the capacitor C3 and the capacitor C4 and supplies power to the pin 1 and the pin 3 of the power supply IC U3. After receiving the input voltage, the power supply IC U3 reduces the voltage again and then the voltage is filtered through the capacitor C1 and the capacitor C2 to supply power to system via the pin 5 of the power supply IC U3. The current-limiting protection circuit is formed by the NPN triode Q3 and the resistor R6. When the voltage drop at two ends of R6 reaches the Base-Emitter (BE) voltage drop of the NPN triode Q3, the NPN triode Q3 conducts to limit the current. The touch circuit 501 includes the touch IC U2, the resistor R10, the capacitor C5, the capacitor C6, and the capacitor C7. When the user touches the sensing panel, the pin 6 of the touch IC U2 senses the signal. The touch IC U2 processes the signal and transfers data through the pin 1 and the pin 3 of the touch IC U2 to the pin 6 and the pin 5 of the single chip microprocessor U1. After the data is received by the single chip microprocessor U1, the interrupt port of the pin 3 of the single chip microprocessor U1 is configured to determine and detect the synchronous zero-crossing signal that is divided, filtered and sampled by the resistor R16, the resistor R17 and the capacitor C11 of the sampling circuit 10. When the interrupt port of the pin 3 of the single chip microprocessor U1 detects the synchronous zero-crossing signal, the pin 1 of the single chip microprocessor U1 outputs the PWM signal to the driver circuit 301. The single chip microprocessor U1 outputs the soft start PWM signal to prevent overshoot of the dimming output each time the dimmer starts. In the single-chip microcomputer processor 401, the resistor R18 and the capacitor C12 form the reset circuit of the single chip microprocessor U1. The capacitor C10 and the capacitor C13 are filtered as an input power supply to the single chip microprocessor U1. The programming interface J1 acts as a programming port of the single-chip program. The PWM signal output by the pin 1 of the single chip microprocessor U1 is filtered by the resistor R8 and the capacitor C8 in the driver circuit 301 to remove clutter disturbance, and the diode D2 is used as a clamper to protect the IGBT Q1. After the gate of IGBT Q1 receives the PWM signal, phase-cut dimming is performed on the waveform rectified by the rectifier DB1. The voltage, after phase-cut dimming, is output by the emitter of the IGBT Q1, pass through the resistor R1, and transferred to the rectifier DB1 for rectification. The rectifier DB1 transfers the rectified dimming voltage to the dimming output terminal P2. Meanwhile, the load current forms the voltage drop signal the resistor R1, and transfers the voltage drop signal to the over-current protection circuit 601. The voltage drop signal is filtered by the resistor R15 and the capacitor C9 in the over-current protection circuit 601 and then transferred to the base of the NPN triode Q4. The signal amplification circuit, formed by the NPN triode Q4, the resistor R9, the resistor R13 and the resistor R14, amplifies the filtered voltage drop signal and then transfers the filtered voltage drop signal to the ADC port of the pin 3 of the single chip microprocessor U3 to detect if the voltage exceeds the preset voltage. If the voltage exceeds the preset voltage, the single chip microprocessor U1 cuts off the output of the PWM signal, which achieves failure protection function. The pin 1, the pin 2, the pin 4 and the pin 8 of the rotary encoder VRS in the brightness regulator 701 are connect to the pin 14, the pin 15, the pin 16 and the pin 17 of the single chip microprocessor U1, respectively. The rotary encoder VRS sets 10 levels numbered 0-9 to adjust the duty ratio of the initial PWM signal output from the single-chip microprocessor U3, that is, the minimum brightness when switching on, so as to meet the different requirements for a minimum brightness. In some cases, the rotary encoder VRS is optional. Alternatively, the adjustable resistor is configured to divide the voltage and the single chip microprocessor acquires the voltage and then converts the voltage by the ADC, so as to change the brightness. The above embodiment is the best mode of the present invention rather than the only mode. The present invention is not limited by the above embodiment. The same or similar technical solutions capable of achieving the outcome of the present invention shall fall into the scope of protection of the present invention.

The present invention has the following advantages. The single-input and single-output wiring method saves substantial time and expense in practical engineering applications. The stable and reliable power supply circuit is designed and configured to make the touch dimmer have good dimming effect and compatibility in the single-input and single-output wiring method. The dimmer is able to adjust the minimum brightness to meet different requirements of minimum brightness, and has an over-current limiting protection circuit to allow the dimmer to function reliably.

Above all, the modifications within the principle of the present invention can be made by the ordinary person skilled in the art. These modifications shall also be considered to fall into the scope of protection of the present invention.

What is claimed is:

1. A single-input and single-output touch phase-cut dimming controller, comprising: a AC input terminal, a dimming output terminal, a voltage dependent resistor, a rectifier, a first diode, an insulated gate bipolar transistor (IGBT), a first resistor, a sampling circuit, a power supply circuit, a driver circuit, a single-chip microcomputer processor, a touch circuit, an over-current protection circuit, and a brightness regulator; wherein the AC input terminal is connected to a first end of the voltage dependent resistor; the dimming output terminal is connected to a second end of voltage dependent resistor; the AC input terminal is connected to a first end of an AC input of the rectifier; a second end of the AC input of the rectifier is connected to the dimming output terminal; an output positive electrode of the rectifier is connected to an anode of the first diode; a cathode of the first diode is connected to the sampling circuit and the power supply circuit; the output positive electrode of the rectifier is connected to a collector of the IGBT; an emitter of the IGBT and a first end of the first resistor are connected to the over-current protection circuit; a second end of the first resistor is connected to an input negative electrode of the rectifier and the ground of the circuit; the power supply circuit is connected to the driver circuit, the single-chip microcomputer processor the touch circuit and the over-current protection circuit; and the single-chip microcomputer processor is connected to the sampling circuit, the driver circuit, the touch circuit, the over-current protection circuit and the brightness regulator.

2. The single-input and single-output touch phase-cut dimming controller according to claim 1, wherein the sampling circuit comprises a first capacitor, a plurality of second resistors; the power supply circuit comprises a plurality of third resistors, a zener diode, a first NPN triode, a second NPN triode, a plurality of second capacitors and a power supply IC; the driver circuit comprises a plurality of fourth resistors, a third capacitor and a second diode; the single-chip microcomputer processor comprises the single chip microprocessor, a plurality of fourth capacitors, a fifth resistor and a programming interface; the touch circuit comprises a touch IC, a sixth resistor and a plurality of fifth capacitors; the over-current protection circuit comprises a plurality of seventh resistors, a sixth capacitor and a third NPN triode; the brightness regulator comprises a rotary encoder; and the components on each circuit unit are correspondingly connected to and adapt to each other according to functional requirements of a circuit design.

* * * * *